(12) United States Patent  (10) Patent No.: US 9,137,349 B2
Huang et al.  (45) Date of Patent: Sep. 15, 2015

(54) MULTI-ANTENNA MOBILE PHONE DATA CARD AND METHOD FOR REDUCING SPECIFIC ABSORPTION RATE

(75) Inventors: Pan Huang, Shenzhen (CN); Lu Zhang, Shenzhen (CN); Hui Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 42 days.

(21) Appl. No.: 14/129,444

(22) PCT Filed: Nov. 16, 2011

(86) PCT No.: PCT/CN2011/082283
§ 371 (c)(1),
(2), (4) Date: Dec. 26, 2013

(87) PCT Pub. No.: WO2012/151903
PCT Pub. Date: Nov. 15, 2012

(65) Prior Publication Data
US 2014/0135064 A1  May 15, 2014

(30) Foreign Application Priority Data
Aug. 16, 2011 (CN) .......................... 2011 1 0234209

(51) Int. Cl.
*H04B 1/3816* (2015.01)
*H04M 1/725* (2006.01)
(Continued)

(52) U.S. Cl.
CPC ......... *H04M 1/72527* (2013.01); *H01Q 1/2275* (2013.01); *H01Q 1/245* (2013.01); *H01Q 1/48* (2013.01)

(58) Field of Classification Search
CPC .................................................. H01Q 1/243
USPC .................... 455/558, 575.5; 343/702, 745
See application file for complete search history.

(56) References Cited
U.S. PATENT DOCUMENTS 7,528,783 B2    5/2009  Takagi
7,852,272 B2 *  12/2010 Imano et al. .................. 343/702
(Continued)

FOREIGN PATENT DOCUMENTS

CN    1909284 A    2/2007
CN    101227020 A  7/2008
CN    102005646 A  4/2011

OTHER PUBLICATIONS
International Search Report in international application No. PCT/CN2011/082283, mailed on May 24, 2012. (2 pages—see entire document).
(Continued)

*Primary Examiner* — Tuan H Nguyen
(74) *Attorney, Agent, or Firm* — Oppedahl Patent Law Firm LLC

(57) ABSTRACT

The present disclosure provides a multi-antenna mobile phone data card and method for reducing a specific absorption rate, where the data card includes: a radio frequency (RF) substrate, antennas configured to transmit and receive signals, and a feed source, connected between the RF substrate and the antennas, configured to excite the antennas, the RF substrate has a rectangular shape, and the feed source is arranged at a first corner of the RF substrate, a first hollow portion is arranged at a second corner which is adjacent to the first corner and is located on a short side of the RF substrate on which the first corner is located, the first hollow portion is provided with a first metal strip, the first metal strip has an end connected with the short side, and another end as a free end, a first electrical length formed from the feed source to the free end of the first metal strip is equal to a second electrical length formed from the feed source to another short side along a long side on which the first corner is located. According to the present disclosure, through the method of changing the shape of the RF substrate, the same electrical lengths is obtained from the feed source respectively to several edge points on the RF substrate, and thus reducing the current peak and the SAR value on the RF substrate and saving the structure space, thereby reducing the radiation hazard of the data card to the human body.

10 Claims, 5 Drawing Sheets

(51) Int. Cl.
*H01Q 1/24* (2006.01)
*H01Q 1/48* (2006.01)
*H01Q 1/22* (2006.01)

(56) References Cited

U.S. PATENT DOCUMENTS

| | | |
|---|---|---|
| 8,624,788 B2 * | 1/2014 | Ayatollahi .................. 343/745 |
| 2005/0159195 A1 | 7/2005 | Huber et al. |
| 2008/0169984 A1 | 7/2008 | Takagi |

OTHER PUBLICATIONS

English Translation of the Written Opinion of the International Search Authority in international application No. PCT/CN2011/082283, mailed on May 24, 2012. (7 pages—see entire document).

Supplementary European Search Report in European application No. 11865157.9, mailed on Dec. 15, 2014. (12 pages—see entire document).

* cited by examiner

MULTI-ANTENNA MOBILE PHONE DATA CARD AND METHOD FOR REDUCING SPECIFIC ABSORPTION RATE

TECHNICAL FIELD

The present disclosure relates to mobile communication techniques, and in particular to a multi-antenna mobile phone data card and method for reducing specific absorption rate (SAR).

BACKGROUND

With the rapid development of wireless communication techniques, personal mobile phone data card (e.g., mobile phone, data card, MiFi/Hotspot) has been extensively popularized and applied. In a daily application scenario, a distance between such a product and a human body has become smaller and smaller, therefore the impact of electromagnetic radiation induced by the mobile phone data card on human health becomes a matter of public concerns.

Generally, a SAR indicator is applied to measure energy absorbed by the human body under electromagnetic exposure environment around the world. Many countries formulate relevant laws and regulations, in which an upper limit of the SAR value of the mobile phone data card is limited to ensure the safety of the electromagnetic radiation to the human body. For instance, Federal Communications Commission (FCC) explicitly regulates the maximum allowable SAR of various wireless mobile terminals when interacted with the human body. In the light of the regulation, for a product such as the mobile phone, a SAR peak value must not exceed 1.6 mW/g when placed close to a side of the human brain; for a product such as the data card, the SAR value must not exceed an upper limit of 1.6 mW/g (1.2 mW/g is suggested) near the whole surface of the product which is probably contacted by the human body. In 2010, the FCC has further put forwarded a regulation relevant to the SAR value on the MiFi (a portable broadband wireless apparatus) and Hotspot (a wireless hot spot).

As shown in FIG. 1, it is a schematic diagram illustrating a planar structure of a wireless mobile phone data card. The existing mobile phone data card consists of an antenna 1, a feed source 2, and a radio frequency (RF) substrate 3, where both the antenna 1 and the RF substrate 3 are made of metal material, and the antenna is configured to transmit and receive a signal, and the feed source connected between the RF substrate and the antenna is configured to excite the antenna. A distance from the feed source 2 respectively to an end of a short side and an end of a long side of the RF substrate 3 is distance 4 and distance 5, respectively. When the antenna 1 is operated, a result excited by the antenna 1 and the RF substrate 3 is that: a high-frequency current flows in the RF substrate 3; due to different electrical lengths in two directions, i.e., the short side and the long side, the excited currents in the RF substrate 3 flow in a same direction and cannot be dispersed, and thus leading to a very high current peak on the RF substrate, which in turn results in a relative higher SAR value.

Existing methods for reducing SAR peak value are generally achieved at the expense of the communication quality of the antenna. For example, the SAR peak value may be reduced by reducing an output power lever of a RF power amplifier or by placing a wave-absorbing material inside the terminal and coating a wave-absorbing layer. In addition, another method is provided by arranging a conductor-reflector and a shielding device in the mobile phone data card to isolate the electromagnetic wave from the antenna to the side of the human body.

However, by means of the measures such as the unilateral reflector mentioned above, the radiation from the antenna to one side of the human body is reduced, while the radiation to the other side is enhanced. Therefore, the use of the reflector is more applicable for the products such as mobile phones rather than the data cards. Further, the reflector and the shielding device need a greater space during an assembling process, and thus cannot satisfy the requirement of miniaturization design for the mobile phone data card.

SUMMARY

According to an aspect of the disclosure, the disclosure provides a multi-antenna mobile phone data card and method for reducing a specific absorption rate (SAR), so as to reduce the radiation hazard of the mobile phone data card to a human body.

The present disclosure provides a multi-antenna mobile phone data card for reducing specific absorption rate (SAR), including: a radio frequency (RF) substrate, antennas configured to transmit and receive signals, and a feed source, connected between the RF substrate and the antennas, configured to excite the antennas, the RF substrate has a rectangular shape, the feed source is arranged at a first corner of the RF substrate, a first hollow portion is arranged at a second corner which is adjacent to the first corner and is located on a short side of the RF substrate on which the first corner is located, the first hollow portion is provided with a first metal strip, the first metal strip has an end connected with the short side, and another end as a free end, a first electrical length formed from the feed source to the free end of the first metal strip is equal to a second electrical length formed from the feed source to another short side along a long side on which the first corner is located.

Preferably, a second hollow portion may be arranged at a corner in a diagonal line to the first corner, the second hollow portion is provided with a second metal strip, the second metal strip may have an end connected with the RF substrate, and another end as a free end; a third electrical length formed from the feed source to a concave point of the second hollow portion is equal to the second electrical length.

Preferably, each of the first hollow portion and the second hollow portion may have a rectangular shape; and each of the first metal strip and the second metal strip may be bended at an angle of 90 degree.

Preferably, each of the first metal strip and/or the second metal strip may have a curve shape.

Preferably, the second metal strip may have an end connected with the short side on which the corner in a diagonal line is located.

The present disclosure further provides a method for reducing a specific absorption rate (SAR) of a mobile phone data card, wherein the data card includes: a radio frequency (RF) substrate, antennas configured to transmit and receive signals, and a feed source, connected between the RF substrate and the antennas, configured to excite the antennas, the RF substrate has a rectangular shape, and the feed source is arranged at a first corner of the RF substrate, the method includes the following steps:

arranging a first hollow portion at a second corner of the RF substrate, wherein the second corner is adjacent to the first corner and is located on a short side on which the first corner is located; and arranging a first metal strip on the first hollow portion, wherein the first metal strip has an end connected with the short side, and another end as a free end, so as to make a first electrical length formed from the feed source to the free end of the first metal strip equal to a second electrical length formed from the feed source to another short side along a long side on which the first corner is located.

Preferably, the method may further include:

arranging a second hollow portion at a corner in a diagonal line to the first corner; and arranging a second metal strip on the second hollow portion, wherein the second hollow portion has an end connected with the RF substrate, and another end as a free end, so as to make a third electrical length formed from the feed source to a concave point of the second hollow portion equal to the second electrical length.

Preferably, each of the first hollow portion and the second hollow portion may have a rectangular shape; and each of the first metal strip and the second metal strip may be bended at an angle of 90 degree.

Preferably, the second metal strip may have one end connected with the short side on which the corner in a diagonal line is located.

According to the multi-antenna mobile phone data card and method for reducing a specific absorption rate of the present disclosure, through a way of changing a shape of a RF baseband circuit board (a RF substrate) and performing some structure improvement, the same electrical lengths is obtained from the feed source respectively to several edge points on the RF substrate, and thus reducing the current peak on the RF substrate, reducing the SAR value and saving the structure space without affecting the overall radiation quality of the antennas of the mobile phone data card, thereby reducing the radiation hazard of the mobile phone data card to the human body; additionally, for the present disclosure, it is not needed to make a significant change on a designed antenna, circuit and structure, and thus saving the cost and also the space; and the corresponding application has a great flexibility and adaptability, and thus is advantageous to perform a miniaturization design of the mobile phone data card.

DETAILED DESCRIPTION

According to various embodiments of the present disclosure, through a way of changing a shape of a RF baseband circuit board (a RF substrate) and performing some structure improvement, the same electrical lengths is obtained from the feed source respectively to several edge points on the RF substrate, and thus reducing the current peak on the RF substrate, reducing the SAR value and saving the structure space without affecting the overall radiation quality of the antennas of the mobile phone data card.

Figure 1:
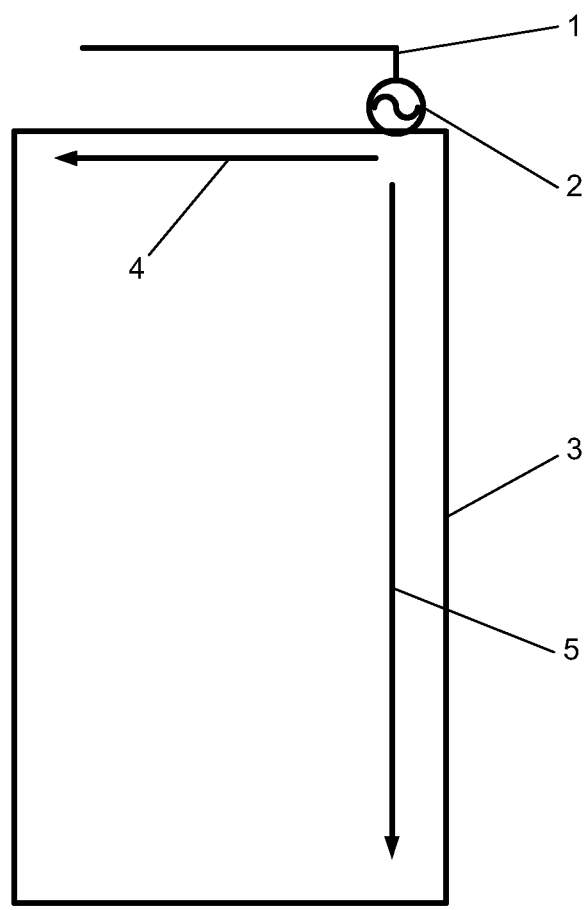
FIG. 1 is a schematic diagram illustrating a planar structure of a wireless mobile phone data card.
Figure 2:
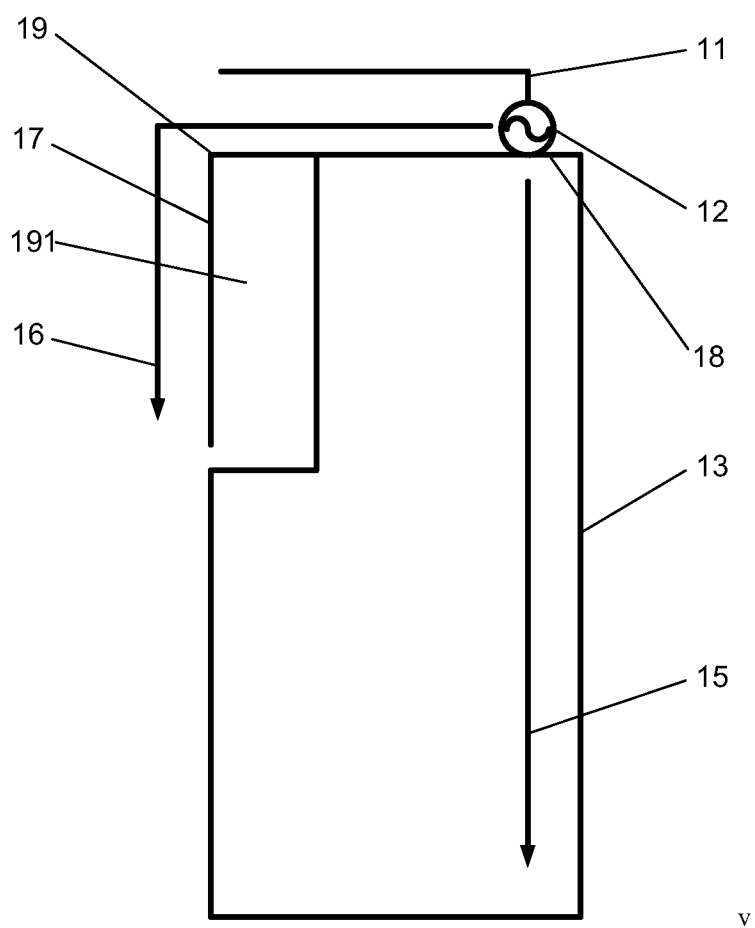
FIG. 2 is a schematic diagram illustrating a planar structure of an embodiment of a multi-antenna mobile phone data card for reducing a specific absorption rate of the present disclosure.

As shown in FIG. 2, an embodiment of the present disclosure proposes a multi-antenna mobile phone data card for reducing a specific absorption rate on the basis of the existing techniques, including: a radio frequency (RF) substrate 13, antennas 11 configured to transmit and receive signals, and a feed source 12, connected between the RF substrate 13 and the antennas 11, configured to excite the antennas 11.

Where, the RF substrate 13 is a multi-layer PCB with a RF baseband circuit, and the RF substrate 13 in the embodiment has a rectangular shape. The feed source 12 is arranged at a first corner 18 (i.e., a top right corner of the RF substrate in FIG. 2) of the RF substrate 13. A first hollow portion 191 is arranged at a second corner 19 (i.e., a top left corner of the RF substrate in FIG. 2) which is adjacent to the first corner 18 and is located on a short side of the RF substrate 13 on which the first corner 18 is located. The first hollow portion 191 is provided with a first metal strip 17, with one end connected with the short side of the RF substrate 13 on which the first corner 18 is located, and another end as a free end, i.e., the free end is disconnected with the RF substrate 13. The length of the first metal strip 17 is adjusted to make a first electrical length 16 from the feed source 12 to the free end of the first metal strip 17 equal to a second electrical length 15 from the feed source 12 to another short side along a long side of the RF substrate 13 on which the first corner 18 is located.

Specifically, the first hollow portion 191 in the embodiment has a rectangular shape, and the first metal strip 17 is bended at an angle of 90 degree, where the bended shape substantially fits with two rectangular outer sides of the first hollow portion 191, i.e., with two sides of the top left corner of the RF substrate 13 in FIG. 2. In both ends of the first metal strip 17, the end located at the upper side of the top left corner is connected with the short side located on the top of the RF substrate 13; the end located at a side edge of the top left corner is a free end, which is disconnected with the RF substrate 13.

According to the embodiment, by means of hollowing a metal plate located on the top left corner (the second corner 19) of the RF substrate 13, the hollow portion 191 of the RF substrate 13 is replaced with a metal strip (the first metal strip 17), one end of which is disconnected with the RF substrate 13. The first electrical length 16 from the feed source 12 to the end of the first metal strip 17 is formed on the RF substrate 13. Through adjusting the length of the first metal strip 17, the first electrical length 16 is made equal to or approximately equal to the second electrical length 15 formed from the feed source 12 to another short side along the long side on which the top right corner (the first corner 18) is located, and thus the excited current in the RF substrate 13 is dispersed into two directions, thereby the excited high-frequency current peak in the RF substrate 13 is reduced, and the SAR value is reduced.

It should be noted that the first metal strip 17 is not limited to be bended at an angle of 90 degree, and may also have a curve shape; the first hollow portion 191 may be not limited to have the rectangular shape; in order to reduce the change of the original RF substrate 13 as far as possible, a rectangular shape is preferable. In addition, the long side of the first hollow portion 191 may be the same as either the long side or the short side of the RF substrate 13, i.e., the first hollow portion 191 may be arranged laterally or longitudinally.

According to the embodiment, the SAR value is improved by changing the structure of the RF baseband circuit board, and it is not needed to make a significant change on a designed antenna, circuit and structure, and thus saving a cost, and also a space; and the corresponding application has a great flexibility and adaptability, and thus is advantageous to perform a miniaturization design of the mobile phone data card.

Figure 3:
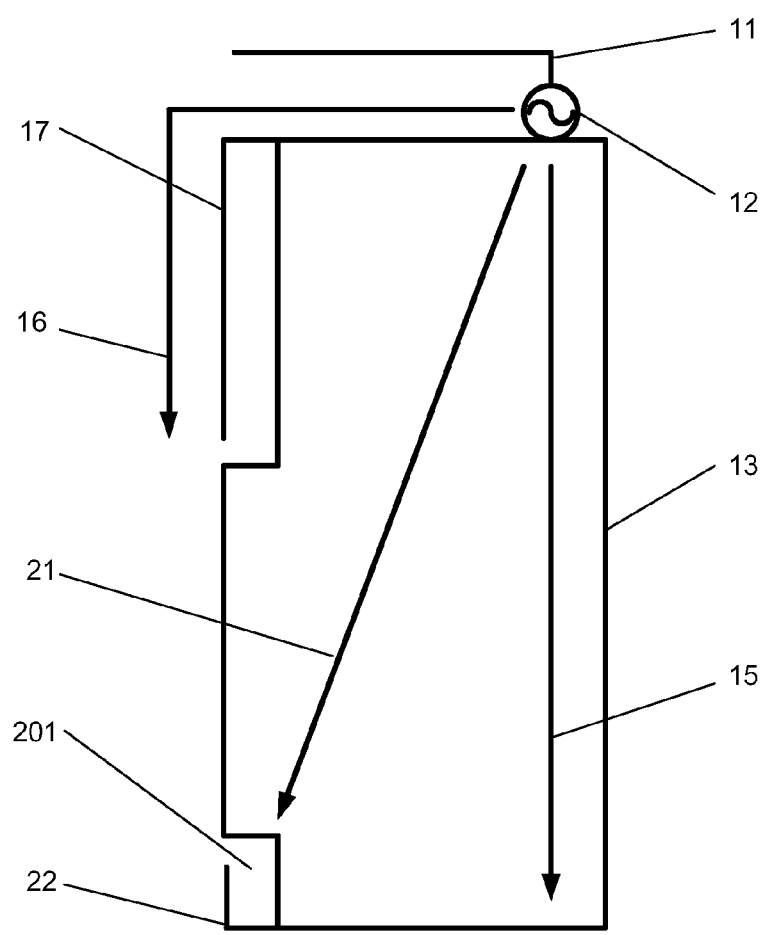
FIG. 3 is a schematic diagram illustrating a planar structure of another embodiment of a multi-antenna mobile phone data card for reducing a specific absorption rate of the present disclosure.

As shown in FIG. 3, another embodiment of the present disclosure provides a multi-antenna mobile phone data card for reducing a specific absorption rate, where the RF substrate 13 is further improved on the basis of the first metal strip 17 which is introduced into the embodiment mentioned above.

Specifically, a second hollow portion 201 is arranged at a corner in a diagonal line (i.e., a bottom left corner of the RF substrate in FIG. 3) to a first corner (i.e., a top right corner of the RF substrate in FIG. 3). The second hollow portion 201 is provided with a second metal strip 22, with one end connected with the RF substrate 13, and another end as a free end. The length of the second metal strip 22 is adjusted to make a third electrical length 21 formed from the feed source 12 to a concave point of the second hollow portion 201 (i.e., a distance from the feed source 12 to a pointed end of the hollow portion at the bottom left corner of the RF substrate) equal to the first electrical length 16 and the second electrical length 15.

In a similar way as the embodiment mentioned above, the second hollow portion 201 in the embodiment has a rectangular shape, and the second metal strip 22 is bended at an angle of 90 degree, where the bended shape substantially fits with two rectangular outer sides of the second hollow portion 201, i.e., with two sides of the bottom left corner of the RF substrate 13 in FIG. 3. In both ends of the second metal strip 22, the end located at a side edge of the bottom left corner is a free end, which is disconnected with the RF substrate 13; and the end located at a lower side of the bottom left corner is connected with the bottom side of the RF substrate 13, i.e., with the short side of the RF substrate 13 on which the bottom left corner of the RF substrate 13 is located.

According to the embodiment on the basis of the embodiment mentioned above, the bottom left corner of the RF substrate 13 is performed a hollowing process, the hollow portion of the RF substrate 13 is replaced with a metal strip (the second metal strip 22), one end of which is disconnected with a metal plate of the RF substrate 13. By this means, the third electrical length 18 is further introduced into the embodiment on the basis of the two existing similar electrical length 15 and electrical length 16. Through these three similar electrical lengths, the transmitting and receiving performance of the antennas 11 is not affected while the peak current on the RF substrate 13 is greatly reduced, and the SAR value is further reduced, thereby the radiation from the mobile phone data card to the human body is further reduced.

Figure 4:
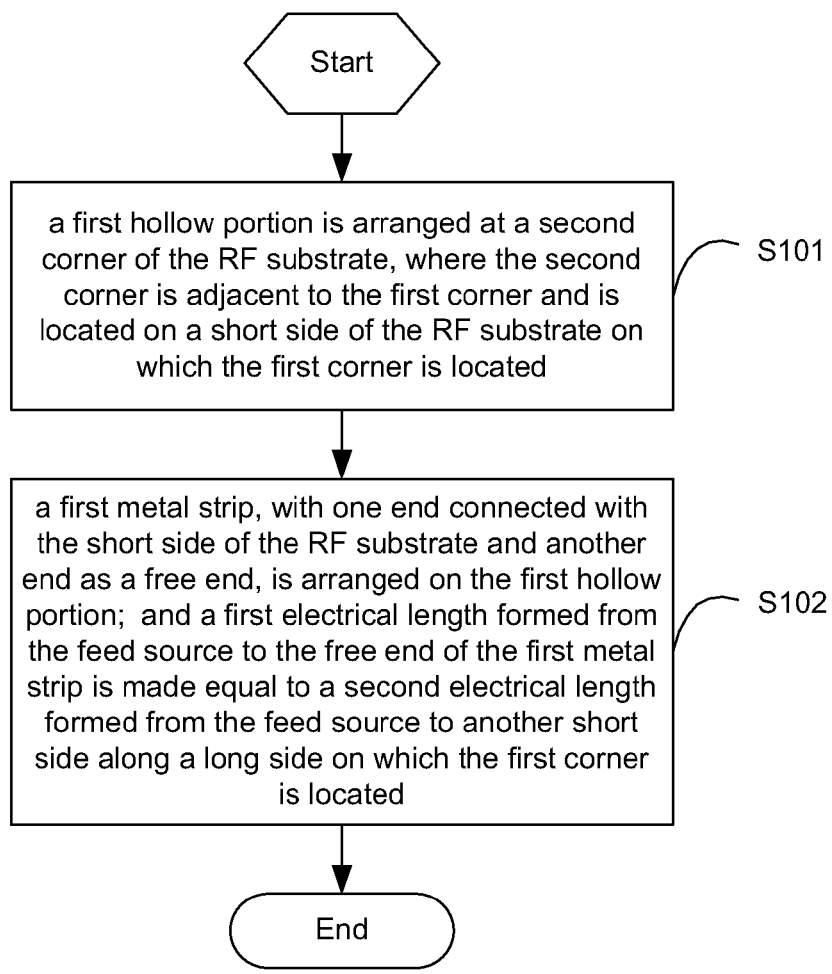
FIG. 4 is a flow chart of an embodiment of a method for reducing a specific absorption rate of a mobile phone data card of the present disclosure.

As shown in FIG. 4, the present disclosure provides a method for reducing a specific absorption rate of a mobile phone data card corresponding to the embodiment of the multi-antenna mobile phone data card for reducing specific absorption rate as shown in FIG. 2, where the data card includes: a RF substrate, antennas configured to transmit and receive signals, and a feed source connected between the RF substrate and the antennas, configured to excite the antennas. The RF substrate has a rectangular shape, and the feed source is arranged at a first corner of the RF substrate. The method includes the following steps.

In step S101, a first hollow portion is arranged at a second corner of the RF substrate, where the second corner is adjacent to the first corner and is located on a short side of the RF substrate on which the first corner is located;

in step S102, a first metal strip, with one end connected with the short side of the RF substrate and another end as a free end, is arranged on the first hollow portion; and a first electrical length formed from the feed source to the free end of the first metal strip is made equal to a second electrical length formed from the feed source to another short side along a long side on which the first corner is located.

The planar structure of the mobile phone data card in the embodiment is shown in FIG. 2. According to the embodiment, by means of hollowing a metal plate located on the top left corner of the RF substrate, the hollow portion of the RF substrate is replaced with a metal strip (the first metal strip), one end of which is disconnected with the RF substrate. The first electrical length from the feed source to the end of the first metal strip is formed on the RF substrate. Through adjusting the length of the first metal strip, the first electrical length is made equal to or approximately equal to the second electrical length formed from the feed source to another short side along the long side on which the first corner is located, and thus the excited current in the RF substrate is dispersed into two directions, thereby the excited high-frequency current peak in the RF substrate is reduced, and the SAR value is reduced.

Figure 5:
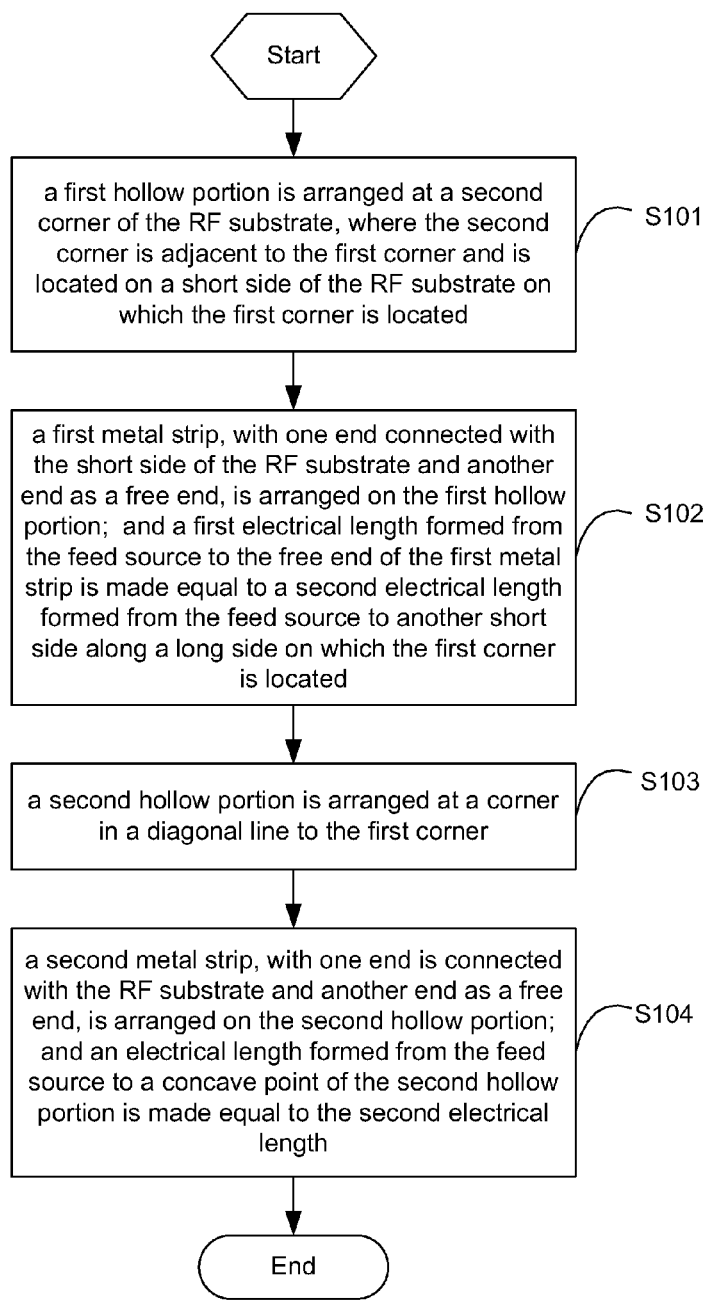
FIG. 5 is a flow chart of another embodiment of a method for reducing a specific absorption rate of a mobile phone data card of the present disclosure.

As shown in FIG. 5, the present disclosure provides another method for reducing a specific absorption rate of a mobile phone data card corresponding to the embodiment of the multi-antenna mobile phone data card for reducing specific absorption rate as shown in FIG. 3. The method further includes the following steps based on the above embodiment of the method.

In step S103, a second hollow portion is arranged at a corner in a diagonal line to a first corner;

in step S104, a second metal strip, with one end connected with the RF substrate and another end as a free end, is arranged on the second hollow portion; and an electrical length formed from the feed source to a concave point of the second hollow portion is made equal to the second electrical length.

The planar structure of the mobile phone data card in the embodiment is shown in FIG. 3.

According to the embodiment on the basis of the embodiment of the method mentioned above, the bottom left corner of the RF substrate is performed a hollowing process, the hollow portion of the RF substrate is replaced with a metal strip (the second metal strip), one end of which is disconnected with a metal plate of the RF substrate. By this means, the third electrical length is further introduced into the embodiment on the basis of the two existing similar electrical lengths. Through these three similar electrical lengths, the peak current on the RF substrate is greatly reduced, and the SAR value is further reduced, thereby the radiation from the mobile phone data card to the human body is further reduced.

According to the embodiments of the present disclosure, through using the method of changing the shape of the RF substrate without affecting the overall radiation quality of the antennas of the mobile phone data card, the receiving and transmitting performance of the antennas is not affected, while a local SAR peak value is reduced and the radiation hazard of the mobile phone data card to a human body is reduced. In addition, it is not needed to make a significant change on the designed antenna, circuit and structure, and thus saving the cost and the space; and the corresponding application has a great flexibility and adaptability, and thus is advantageous to perform a miniaturization design of the mobile phone data card.

What described are merely preferred embodiments of the disclosure, and are not intended to limit the scope of the present disclosure. An equivalent structure or flow change based on the description and the accompanying drawings of the present disclosure, or applications by directly or indirectly applying the description and the accompanying drawings of the present disclosure in other related technical field fall in the scope of the present disclosure.

INDUSTRIAL APPLICABILITY

According to the present disclosure, through the method of changing the shape of the RF substrate, the same electrical lengths is obtained from the feed source respectively to several edge points on the RF substrate, and thus reducing the current peak and the SAR value on the RF substrate and saving the structure space, thereby reducing the radiation hazard of the data card to the human body.

The invention claimed is:

1. A multi-antenna mobile phone data card for reducing a specific absorption rate (SAR), comprising:
a radio frequency (RF) substrate;
antennas configured to transmit and receive signals; and
a feed source, connected between the RF substrate and the antennas, configured to excite the antennas,
wherein the RF substrate has a rectangular shape, the feed source is arranged at a first corner of the RF substrate, a first hollow portion is arranged at a second corner which is adjacent to the first corner and is located on a short side of the RF substrate on which the first corner is located, the first hollow portion is provided with a first metal strip, the first metal strip has an end connected with the short side, and another end as a free end, a first electrical length formed from the feed source to the free end of the first metal strip is equal to a second electrical length formed from the feed source to another short side along a long side on which the first corner is located.

2. The mobile phone data card according to claim 1, wherein a second hollow portion is arranged at a corner in a diagonal line to the first corner, the second hollow portion is provided with a second metal strip, the second metal strip has an end connected with the RF substrate, and another end as a free end; a third electrical length formed from the feed source to a concave point of the second hollow portion is equal to the second electrical length.

3. The mobile phone data card according to claim 2, wherein each of the first hollow portion and the second hollow portion has a rectangular shape; and each of the first metal strip and the second metal strip is bended at an angle of 90 degree.

4. The mobile phone data card according to claim 2, wherein each of the first metal strip and/or the second metal strip has a curve shape.

5. The mobile phone data card according to claim 2, wherein the second metal strip has an end connected with the short side on which the corner in a diagonal line is located.

6. A method for reducing a specific absorption rate (SAR) of a mobile phone data card, wherein the data card comprises: a radio frequency (RF) substrate, antennas configured to transmit and receive signals, and a feed source, connected between the RF substrate and the antennas, configured to excite the antennas, wherein the RF substrate has a rectangular shape, and the feed source is arranged at a first corner of the RF substrate, the method comprises:
arranging a first hollow portion at a second corner of the RF substrate, wherein the second corner is adjacent to the first corner and is located on a short side of the RF substrate on which the first corner is located; and
arranging a first metal strip on the first hollow portion, wherein the first metal strip has an end connected with the short side, and another end as a free end, so as to make a first electrical length formed from the feed source to the free end of the first metal strip equal to a second electrical length formed from the feed source to another short side along a long side on which the first corner is located.

7. The method according to claim 6, further comprising:
arranging a second hollow portion at a corner in a diagonal line to the first corner;
arranging a second metal strip on the second hollow portion, wherein the second hollow portion has an end connected with the RF substrate, and another end as a free end, so as to make a third electrical length formed from the feed source to a concave point of the second hollow portion equal to the second electrical length.

8. The method according to claim 7, wherein each of the first hollow portion and the second hollow portion has a rectangular shape; and each of the first metal strip and the second metal strip is bended at an angle of 90 degree.

9. The method according to claim 8, wherein the second metal strip has an end connected with the short side on which the corner in a diagonal line is located.

10. The method according to claim 7, wherein the second metal strip has an end connected with the short side on which the corner in a diagonal line is located.

* * * * *